UNITED STATES PATENT OFFICE.

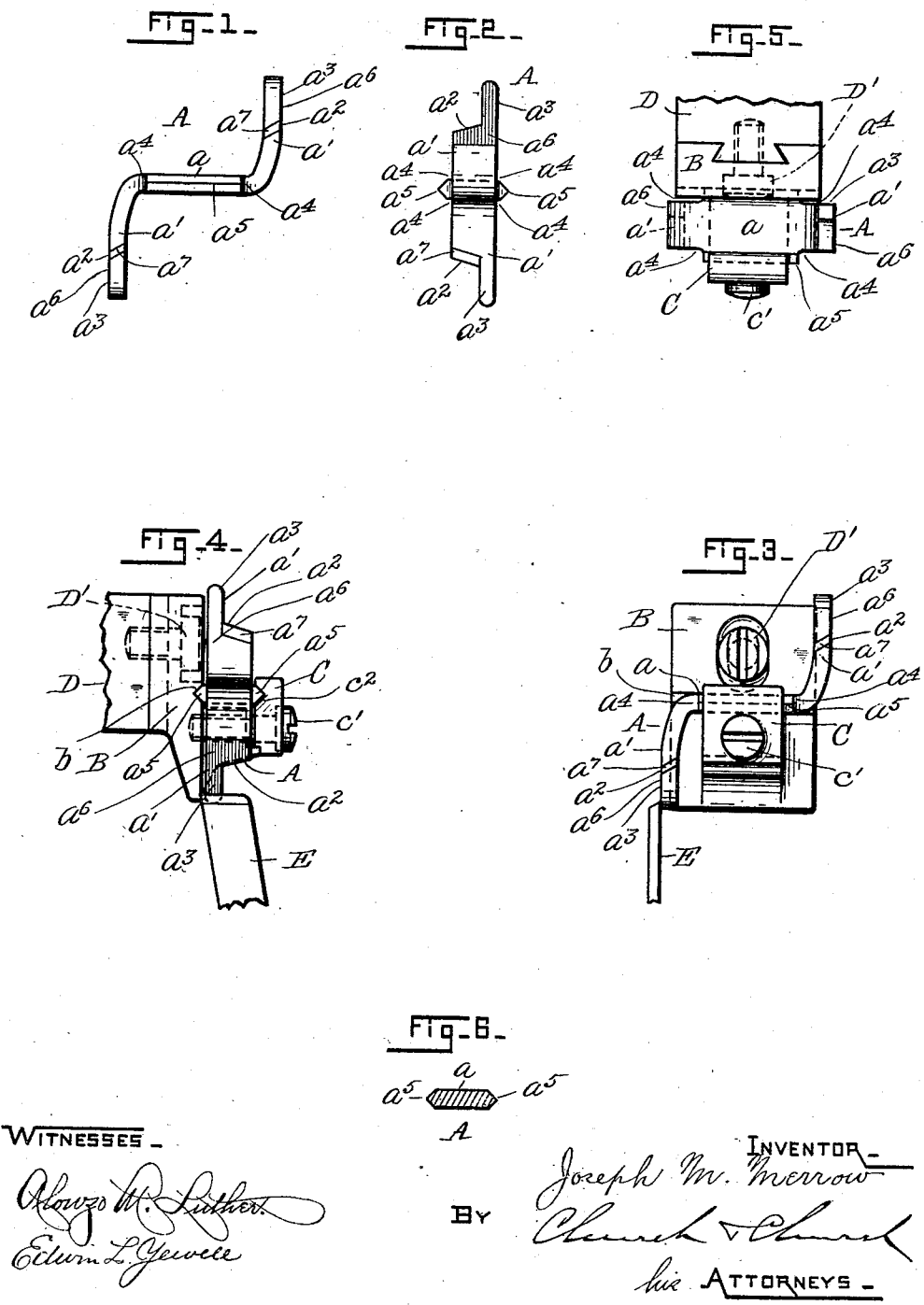

JOSEPH M. MERROW, OF HARTFORD, CONNECTICUT, ASSIGNOR TO THE MERROW MACHINE COMPANY, OF HARTFORD, CONNECTICUT, A CORPORATION OF CONNECTICUT.

TRIMMING-CUTTER FOR SEWING-MACHINES.

No. 907,622.      Specification of Letters Patent.      Patented Dec. 22, 1908.

Application filed December 9, 1905. Serial No. 291,135.

*To all whom it may concern:*

Be it known that I, JOSEPH M. MERROW, a citizen of the United States, residing in the city and county of Hartford, State of Connecticut, have invented certain new and useful Improvements in Trimming-Cutters for Sewing-Machines, of which the following is a full, clear, and exact description, reference being had to the accompanying drawings, forming a part of this specification, and to the figures and letters of reference thereon.

This invention relates to trimming cutters, its principal object being to provide a simple and strong double ended reversible cutter which may be easily and accurately sharpened.

A further object is to provide the cutter with guides for accurately locating and for adjusting it substantially at right angles to the faces of the bent ends to bring these ends in turn into operative relation with the side of a companion cutter.

In the accompanying drawings—Figure 1 is a front elevation of a cutter embodying the present improvements. Fig. 2 is a side elevation of the cutter as seen from the right of Fig. 1. Fig. 3 is a front view of the cutter mounted upon a holder, showing also a portion of a companion cutter. Fig. 4 is a side elevation of the cutter clamped to its holder, a portion of a support or carrier for the holder and cutter, and a portion of a companion cutter. Fig. 5 is a plan view of the parts shown in Fig. 3 with the companion cutter omitted. Fig. 6 is a sectional view across the body or shank of the cutter.

Similar letters of reference indicate like parts throughout the drawings.

A indicates the cutter; B, the cutter holder; C, the cutter clamp; D, the cutter holder support or carrier; and E, the companion cutter. The cutter A is preferably made from a bar of flat steel which may be rectangular in cross section, the ends $a'$ $a'$ being bent at substantially right angles to the body portion or shank $a$ of the cutter. Each end $a'$ $a'$ is cut away on one edge at an angle forming an acute cutting edge $a^2$ and a guiding finger $a^3$ to protect the edge. The width of the ends is reduced by cutting them away at each edge $a^4$ $a^4$ $a^4$ $a^4$ thus leaving the shank projecting beyond or wider than the ends at both sides.

The side edges of the shank form guides $a^5$ which as illustrated, are preferably wedge shape or beveled to or nearly to a single edge as shown in section in Fig. 8, and the edges are parallel to each other. Each of the bent ends is dressed or ground in a single plane as at $a^6$ $a^6$ including one side of the guiding finger and one face of the cutting edge. The two ground faces $a^6$ $a^6$ are in parallel planes, and it is intended that the cutter A or its companion cutter E shall be moved in a path parallel to the planes of the ground faces. As the guides $a^5$ upon the shank extend beyond the edges of the bent ends of the cutter, thus the cutter may be removed from its holder by loosening without removing the clamp screw $c'$. The cutting edges of the cutter A may in addition or in lieu of having their faces $a^6$ ground, also be sharpened by grinding or "stoning" the bevel sides $a^7$. One of the beveled edges of the shank fits into a corresponding groove $b$ in the holder B and the opposite bevel of the shank fits into a corresponding groove $c^2$ in the clamp C which is pressed towards the cutter holder by the screw $c'$. The cutter A is adapted to be adjusted longitudinally of its shank by loosening the screw $c'$, and the holder B is adjustable in its support or carrier preferably at right angles to the grooves which guide the beveled edges of the shank of the cutter. As shown in the drawings, the support or carrier D is dovetailed upon one of its faces and the adjacent face of the holder is correspondingly grooved, the holder being held to its support or carrier by the screw D' passing through a slot or elongated hole in the holder. The beveled edges of the shank of the cutter also form guides for use in accurately holding the cutter A while the faces of the bent ends are being ground to sharpen the cutting edges.

From the foregoing it will be seen that the cutter A may be removed from its holder and reinserted and turned end for end to bring a new cutting edge and its guiding finger into action.

Having thus described my invention, what I claim as new and desire to secure by Letters Patent, is:—

1. A cutter having a shank and two ends bent in opposite directions at substantially right angles to the shank, the faces of the two ends being in parallel planes and the edges of the cutter being also in parallel planes, each end being formed with a cutting edge and a guiding finger, substantially as shown and described.

2. As an article of manufacture, a cutter the body of which forms a shank both ends of which are turned at an angle to said shank, each end being formed with a cutting edge and the shank being formed with a guide at each edge, substantially as described.

3. As an article of manufacture, a cutter the body portion of which forms a shank both ends of which are turned at an angle to said shank, each end being formed with a cutting edge and a guiding finger and the shank being formed with guides, substantially as described.

4. As an article of manufacture, a reversible cutter bent at an angle at each end, the body or shank portion between the bent ends projecting at each edge beyond the edges of the bent ends and each of said ends being formed with a cutting edge and a corresponding guide or finger, substantially as described.

5. As an article of manufacture, a reversible cutter bent at an angle at each end, the body or shank portion between the bent ends projecting at each edge beyond the edges of the bent ends, said projecting edges being beveled and each of the said ends being formed with a cutting edge and a corresponding guide or finger, substantially as described.

6. A cutter having a shank or body portion and a limb at one end turned at an angle to the body portion, the body portion projecting at each edge beyond the edges of the limb to provide longitudinal guides for the cutter and the limb being provided with a cutting edge, substantially as described.

7. A cutter having two end portions bent at right angles to the central portion or shank, each end having a cutting edge and a guide, the said ends being relatively inverted and adapted to be ground or dressed in parallel planes, each plane including the cutting edge and the guide and said planes being at right angles with the central portion or shank, and longitudinal guides at the edges of the shank whereby direction may be given to the cutter by the guides upon the shank when adjusted at right angles relatively to the planes of the cutting ends.

JOSEPH M. MERROW.

Witnesses:
ALONZO M. LUTHER,
W. C. W. STEWART.